United States Patent [19]
Körner et al.

[11] Patent Number: 5,568,256
[45] Date of Patent: Oct. 22, 1996

[54] METHOD AND APPARATUS UTILIZING AN OPTICAL STAGE FOR TOPOGRAPHIC SURFACE ANALYSIS

[75] Inventors: Klaus Körner, Schöneiche; Fritz Holger, Berlin; Lajos Nyarsik, Berlin; Günter Spur, Berlin; Eckart Uhlmann, Berlin, all of Germany

[73] Assignee: Fraunhofer Gesellschaft zur Forderung der angewandten Forschung e.V., Germany

[21] Appl. No.: 230,772

[22] Filed: Apr. 21, 1994

[30] Foreign Application Priority Data

Apr. 21, 1993 [DE] Germany ............... 43 13 057.7
Apr. 21, 1993 [DE] Germany ............... 43 13 061.5
Oct. 8, 1993 [DE] Germany ............... 43 34 388.0

[51] Int. Cl.$^6$ .................................................. G01B 9/02
[52] U.S. Cl. ......................... 356/359; 356/353; 356/354
[58] Field of Search .................................. 356/345, 349, 356/353, 354, 359, 360, 371

[56] References Cited

FOREIGN PATENT DOCUMENTS 4003100  8/1991  Germany ............... 356/349
1163161  6/1985  U.S.S.R. ............... 356/345

*Primary Examiner*—Samuel A. Turner
*Attorney, Agent, or Firm*—Antonelli, Terry, Stout & Kraus

[57] ABSTRACT

A method and apparatus for topographic surface analysis including at least one light source for radiating light, a first light-distributing surface of a first diffraction grating for receiving light from the at least one light source and for reflecting a first bundle of light under normal optical conditions and a second bundle of light formed by diffraction of the first order. A first optical stage is provided for projecting the first and second bundles from the first light-distributing surface in an optically conjugated form onto an object surface to be analyzed of a sample. Light representing the object surface is sharply projected via the first optical stage onto a second light-distributing surface of a second diffraction grating. A second optical stage projects diffracted bundles of light from the second light-distributing surface onto a detector which detects radiation and enables topographic analysis of the object surface.

29 Claims, 11 Drawing Sheets

METHOD AND APPARATUS UTILIZING AN OPTICAL STAGE FOR TOPOGRAPHIC SURFACE ANALYSIS

The invention relates to the micro- and macrotopographic analysis of plane and curved technical surfaces which may be both rough and technically smooth. The term surface may cover polished, lapped, honed, ground, precision-turned and cast surfaces of metal, ceramic or other materials such as synthetic resins etc. The engineering field of application of the invention also includes the analysis of coated or naturally produced surfaces.

As a result of analysis the high-resolution three-dimensional profile of the surface is obtained in a numerical form. In a microtopographic analysis the known roughness characteristics according to DIN Standard 4762, for instance, may be computed from the detected surface data. However, an application of the invention in macroscopy is also possible. E.g. the variation in shape or planarity of large-size objects such as metal sheet panels can be determined both in the untreated and in the varnished condition.

The commercially available measuring equipment for detecting the surface topography is predominantly suitable for optically smooth surfaces or surfaces subjected to ultra-precision machining. If the surfaces to be analysed present surface measures higher and 50 nm the surfaces are generally non-reflecting. In such a case the interferometric analysis produces an interference image which cannot be resolved by means of a camera, which means that the interference image so produced is composed of adjacent image elements which have a path difference higher than 180° and which, due to the underlying principle, cannot be evaluated by the common evaluation algorithms. At a macroscopic level this effect manifests itself by the disappearance of the interference fringes or in discontinuous interference fringes.

Even the dual-wavelength interferometry operating on orthogonally incident light is applicable for the analysis of precision-machined or fine-machined surfaces only conditionally since the production of an evaluable interference signal is a prerequisite for the application of this method. In the case of surfaces having an arithmetic surface measure higher than 50 nm this is often no longer the case.

In the known prism interferometers (trade journal Technisches Messen 59 (1992) No. 11, p. 423), in which the object surface is illuminated at an oblique angle, evaluable interference fringes are created at surface measures below 1 μm. Even though, on average, adjacent image elements present path differences of less than 180° the optical projection of the technical surface to be analysed is insufficient due to the anamorphic effect produced by the glass prism. This means that the interference fringes produced under these conditions do not contain the complete information on the surface. In the case of a ground surface, for instance, the fine structure is not completely reflected in the interference fringes and hence in the result. Scratches or flutes are not resolved or are reproduced by values which are substantially too small. This is valid particularly for the imaging of surface details by means of meridional beams.

The consequence of the aforementioned effects is an insufficient lateral resolution of the surface to be analysed, so that the complete microtopographic analysis of isotropic surfaces is either impossible or strongly limited. Even the analysis of the variations from planarity is problematic in the marginal zone or at discontinuities in the surface.

For rough surfaces, which present surface measures higher than 1 μm, neither the dual-wavelength, nor the infrared nor the oblique-illumination interferometric technique is suitable.

The Rough Surface Tester (RST) available from the company of Wyko Corp./U.S.A., which was presented in 1992 for the first time, solves the problem of measuring the surface topography by searching for and finding the white-radiation (white-light) position. In the case of a high surface gradient on the object surface the reliable operation requires a camera having a very high lateral resolution, or else only a comparatively narrow object field can be covered since the modulation in the produced interference images will become zero and hence prevent evaluation in all other cases.

The Mirau-correlation microscope (cf. Appl. Optics 1990, vol. 29. No. 26, p. 3775) actually solves the problem of the microtopographic measurement of technical surfaces but the expenditure in terms of technological provisions for the production of such a microscope is considerable and possible only with the application of chip technology.

Here, too, for the reasons mentioned above already in relation to the Rough Surface Tester, only a very small object field can be evaluated.

The practical application of strip projection instruments is ever-spreading for the analysis of technical surfaces, with the phase shift method being successfully employed.

In the known strip projection instruments the image of a grating is produced in a first optical stage. In a second optical stage then the object surface is projected onto the detector. The employment of two optical stages results, as a rule, however in a large volume of the measuring system configuration.

Common strip projectors operate on gratings presenting a rectangular characteristic. This may be inexpedient if a high precision is to be achieved. It is only with an appropriately approximate sine distribution in the intensity profile of the fringes that the resolution achievable with the phase shift method makes sense from a measuring point of view.

The East German Patent DD 300 046 discloses a projection-type interferometer comprising an interferometric device in the form of a fringe generator. There a very wide angle of incidence on the object surface is realized, with the result of a high sensitivity of the measuring system. Even though, due to the object surface being projected by the light scattered at the object surface, there is a distortion-free projection onto an image detector since the optical axis is orthogonal relative to the object surface the light intensity of the image is very weak for the reason that the reflected portion is lost for imaging.

Hence the evaluable object surface is restricted to a few square centimeters only if a commercial semiconductor laser up to 100 mW luminous efficacy is employed.

Strip projection instruments have been known which project a grating via a microscope onto the object surface. For the achievement of a high sensitivity the grating must be projected at a maximum angle possible relative to the normal of the object surface. This requires an appropriately great numerical aperture of the lens element. Such lens elements are available at reasonable costs for small object fields up to 1 millimeter, at maximum roughly 10 millimeters, object diameter. Experience has shown that for larger object fields up to 100 millimeters approximately lens elements having a greater aperture—i.e. above 0.5—involve a very extensive instrumentation and are very expensive to produce. For this reason this principle has remained confined to applications at the microscopic level.

The present invention is not based on the problem of allowing for the microtopographic surface analysis for waviness and shape of surfaces in terms of optical and also non-optical quality—e.g. in the analysis of precision-machined surfaces—with application of the possibilities entailed by computer-supported image processing technology. The analysis of certain surface structures, such as unknown manually treated surfaces, is intended to be definitely facilitated at a reduction of the uncertainty in measurement of such analyses. Moreover, the invention aims at permitting the coverage of very large object fields so as to achieve a high productivity in measurement. What is highly essential is the aspect that it is possible for the first time to realize the plane measurement of the subject topography at locations which are accessible with difficulties only, e.g. at the inside walls of the precision-machined workpieces.

The application of the invention entails a very substantial improvement of the optical imaging of the technical surface to be analysed with oblique illumination at a wide angle, compared against a conventional strip projection technique. The oblique illumination with light incidence at a wide angle is necessary for measuring the topography of surfaces so as to achieve a high measuring precision or high sensitivity, respectively. A sharply defined image of the entire object field is achieved on the image detector. As a result no information on surface details is lost. The projection strips are speckle-free or low in speckles, present a sinusoidal intensity profile and are therefore distinctly well suitable for evaluation. At the same time the strips contain the complete information about the fine surface structure. With these provisions surfaces can be optically analysed with a very high measuring precision both at the microscopic and macroscopic level, even if these surfaces are optically dull.

Moreover—by contrast to the known solutions available for macroscopic objects in whose case there occurs a distortion of the projected object surface—the application of the present invention provides for a strict geometric similarity of the image of the object surface in the detecting plane and the object surface. For instance, a circular or square segment of the object surface will be projected onto the receiving surface as a circle or square, too. As a result, and on account of the high lateral resolution, geometrically complex structures such as fine discontinuities in the object surface may be reliably detected, independently of their orientation on the surface. The use of the light reflected from the surface entails a very good utilization of the light. And this allows for the analysis of very large surfaces while a commercial common semiconductor laser is employed as light source.

It is possible to use only a single optical stage, which reduces the volume of the measuring instrumentation.

A very substantial advantage entailed by the invention consists in the aspect that if only a single optical stage is used it is yet possible for the first time to detect the surface topography even at hardly accessible locations such as on the inner wall of small bores having a diameters as small as roughly 2 millimeters at minimum. A specific advantage resides in the fact that the illumination and projection of the inner surfaces requires only one opening or the access from one side only.

Compared against the known measuring instruments a very high resolution and precision in measurement are achieved. It is possible now to analyse large-size objects, in particular strip-shaped objects or strip-shaped segments of an object, using a comparatively small measuring apparatus.

A very essential advantage of the invention consists in the aspect that a variable sensitivity of the measuring instrument may be selected, in dependence on the surface topography of the specimen, just via the computer keyboard, i.e. without any manual handling. It is also possible, however, to determine and set the optimum sensitivity of the measuring apparatus in an iterative operation under computer control in the sense of an expert system. With such an implementation the sensitivity and the elevation measuring range may be reduced or enlarged within very wide limits, e.g. by more than one order.

In a band projection device comprising a light source, a light-distributing surface, a projection stage, with the light-distributing surface being disposed at an oblique angle relative to the optical axis of the projection stage, and an object surface equally disposed at an oblique angle relative to the optical axis of the projection stage, the light incident from the light source onto the light-distributing surface arrives, by means of the projection stage, at an oblique angle on the object surface to be analysed, with the light-distributing surface and the object surface being optically conjugated.

On the first hand, a reflector, preferably a plane mirror, may be associated with the object surface in a roughly orthogonal relationship so that the plane mirror and the object surface, or a compensating plane passing through this object surface, form a roof edge. The light emerging from the projection stage arrives via this roof edge again in the projection stage. With these provisions the object light cone reflected from the object surface is projected by the projection stage onto a second light-distributing area in an optically conjugated manner, with the second light-distributing surface being preferably disposed in the same plane as the first light-distributing surface. In such a configuration it is also possible to associate orthogonally a second plane mirror with the light-distributing first face, which second mirror cooperates with the first light-distributing surface to form a roof edge.

In the case of comparatively small object surfaces, e.g. surfaces having a size of a few square centimeters, the projection stage may be configured as 4 f system having two similar lens elements, with the focus of the lens element associated with the two light-distributing surfaces being located in the plane defined by the two light-distributing surfaces and with the focus of the lens element associated with the object surface being located in the roof edge formed by the object surface in cooperation with the plane mirror.

On the other hand, it is also possible, however, to associate with the object surface a second projection stage at the same angle as the first projection stage, rather than the mirror disposed orthogonally relative to the object surface, so as to create an arrangement symmetrical with respect to the object surface as far as the axial position of the two projection stages is concerned. The second projection stage projects the object surface onto a second light-distributing surface in an optically conjugated manner, which second surface must therefore be equally disposed at an oblique angle relative to the optical axis of the second projection stage. In such a configuration the foci of the two projection stages are preferably coincident on the object surface. Compared against the roof edge arrangement, the provision of a second projection stage allows for the projection of a larger object field.

The second projection stage may also be a 4 f-type system.

The first light-distributing surface may be a grating, in the most simple case it may be a multiline grating such as a reflecting diffraction grating. The second light-distributing surface may be a holographic reflecting diffraction grating whose grating spacing or period is so selected that in the first diffraction order the light cone incident at an oblique angle will be reflected at an angle approximately orthogonal to the grating surface. This creates a rectification of the image which is then projected by another projection stage from the grating onto the image detector, with this projection stage possibly comprising a zoom lens. The second light-distributing surface may also be replaced by a light-scattering surface, instead of the grating, e.g. in the form of a rotating focussing screen, onto which the image of the object surface is projected at an oblique angle even though with sufficiently sharp definition. The image detector is preferably a CCD camera linked up with a computer.

When a 4 f-type system is employed for the sharply defined projection of the obliquely disposed object surface onto the second, equally oblique light-distributing surface always a 1:1 projection of the object surface on the image detector is achieved in the event or orthogonal observation of the second surface, which is frequently high expedient in the analysis or study of object surfaces.

In the case of large object surfaces it is expedient to deviate from the 4 f-type system since then only a single large lens must be used in the projection stage. The sharply defined projection of the object is retained in this case, too. The strict similarity between the object and its image, which is then no longer present, must be duly considered when the image is processed.

The first light-distributing surface may be a multiline grating which a light source module is associated with, that comprises a broad-area monochromatic source and a collimator and which is disposed ahead of the grating. In an attempt to avoid the mostly undesirable speckles the light source module may comprise a rotating focussing screen on which a sufficiently large spot is illuminated so as to give rise to a divergent beam. The direction of incidence of the beam may be so selected that two light cones are created in roughly symmetrical relationship relative to the axis of the projection stage, which creates one light cone or beam by reflection in the zeroth diffraction order while the second beam is created by reflection in the first diffraction order at the grating. The grating may, however, also be a structure involving curved lines for an analysis of curved object surfaces. The optimum for the projection onto an image detector is the case where the curved lines of the grating form a roughly equidistant fringe pattern on the object surface. In such a case the light cone reflected in the zero order presents a narrow angle relative to the optical axis whilst the light cone diffracted in the first diffraction order displays an irregular propagation.

The multiline grating may, however, also be a comparatively coarse reflecting diffraction grating presenting less than 10 reflecting lines per millimeter, with a comparatively fine reflecting diffraction grating presenting more than 1000 lines per millimeter being provided on each of the reflecting lines. In such a case the grating may be illuminated in an orthogonal orientation—i.e. along the surface normal—so as to form diffracted beams whilst in the case of a multiline grating presenting straight lines two diffracted beams propagate approximately in symmetrical relationship with a parallel to the optical axis of the projection stage. It is also possible, however, that the multiline grating is provided with curved lines.

The grating is connected to a computer-controlled microtranslator which allows for a sensitive shifting of the grating in the grating plane, e.g. for application of the phase shift method.

In the event that a plane mirror is used, which cooperates with the light-distributing surface to form a roof edge, the object surface is projected via the plane mirror back to the light-distributing surface. Thus one light-distributing surface is sufficient in the system, which may be a multiline grating. In such a configuration, however, a shift of this multiline grating does not result in a phase shift. For this reason the required phase shift is achieved by moving the object surface by means of a computer-controlled lifting table or by a translation of a plane mirror along its normal.

It is equally possible that the grating structure, which represents the first light-distributing surface, is located on a curved surface. This configuration is expedient if strongly curved object surfaces are to be analysed and if the grating structure is to be sharply projected onto the object surface. The analysis of a convex object requires a concave surface of the grating representing the first light-distributing surface. The second light-distributing surface, too, is then located on a concave surface and is preferably configured as a comparatively coarse reflecting grating, with a very fine reflecting grating being applied again onto the reflecting lines of the coarse reflecting grating, too.

The gratings may moreover present the same structure. In such a case a beat is produced on the reflecting diffraction grating constituting the second light-distributing surface, between this reflecting diffraction grating and the image of the reflecting diffraction grating, which represents the first light-distributing surface and is projected onto the object surface and from there back again to the reflecting diffraction grating constituting the second light-distributing surface. This beat image may then be projected onto an image detector by means of a further projection stage. This system is specifically appropriate for shape testing. For instance, the shapes of the surfaces where the first and second light-distributing surfaces are located may have a spherical configuration. If a radially symmetrical aspherical surface is to be analyzed the variation from the sphericality may be contained in the curvature of the lines of the reflecting diffraction grating forming the first light-distributing surface. In the case of an appropriate matching and adjustment straight lines are now created on the aspherical object surface to be analysed—with the exception of the shape faults in the aspherical surface, which actually may create a variation from the straightness of the lines. The arising lines are projected from the aspherical surface onto the second reflecting diffraction grating which may also present straight lines. There a beat of the light grating projected thereon, which is produced in cooperation with the physically present reflecting diffraction grating. The straight lines, however, may be located also on the first grating while the curved lines may also be present on the second grating.

It may be that the second multiline grating, which includes the curved lines, is generated by exposure of a photosensitive layer when a master object is used as reference object in the object position. With such a configuration further objects may be subjected to a comparative analysis with reference to the reference object. With this provision the photosensitive layer may be located on a plane or a curved carrier surface so that an image as highly defined as possible may be achieved. It is also possible, however, to have the grating with the curved lines generated by a computer, e.g. by means of a high-precision plotter, and to reduce is subsequently. Here, too, a curved carrier surface is conceivable for the grating.

It is also possible, however, to operate on a single grating only onto which the image of the object surface is projected again via a plane mirror.

The first light-distributing surface may also be a homogeneous reflecting diffraction grating having a very small grating period. The number of lines per millimeter may amount to roughly 1570 in cases where the system operates on a light wavelength of 633 nm. In this case a lens element, which may be a computer-controlled zoom lens, in combination with an interferometer and a light source may be disposed ahead of the reflecting diffraction grating. The focus plane of the object coincides with the plane of the grating. The interferometer serves to generate the strip pattern which is an interference fringe pattern in the present case. The interfering beams are focussed by means of the lens element and emitted in the form of diffracted light cones. Then a fringe pattern occurs on the reflecting diffraction grating.

The interferometer is preferably a dual-beam interferometer which may be a Michelson's interferometer. The latter is preferably equipped with two triple reflectors, with as little as two roof edge reflectors being sufficient if only the fringe density is to be adjusted. The interferometer preferably operates at the optical path difference of approximately zero. A reflector is connected to a first computer-controlled microtranslator for shifting the reflector along the beam direction so as to be able to adjust the phase. With such a provision it is possible to employ the highly expedient phase shift method. A second microtranslator, which may equally be controlled by a computer, provides for a translation adjustment of one of the two reflectors, thus ensuring a possibility of setting the number of interference fringes. This may also be achieved with computer support. Thus the common dual-wavelength technique may here be applied in the form of a dual-sensitivity technique.

If two triple reflectors are employed in the interferometer and a single bi-axial transverse translator is used as microtranslator for the second triple reflector, it is possible to adjust the number and also the direction of the interference fringes on the object surface. The computer-controlled variation of the number and orientations of the fringes allows for an iterative analysis of an unknown surface of any kind, e.g. by measuring various surface areas of different sensitivity and by composing the entire object surface from sub-areas. Hence the invention offers an opportunity of a computer-controlled iterative topographic analysis of the surfaces of even highly complex unknown surfaces.

With such a configuration the interferometer operates on a light source module comprising a monochromatic source and a collimator. Moreover, the light source module may include a white radiation source for generating a zero-order white radiation fringe on the object surface. This provision facilitates the adjustment of the object surface. The white radiation source is adapted to be turned on and off under computer control. A specific advantage of this system resides in the aspect that the employment of the zero-order white-radiation fringe allows for an analysis of object surfaces having steps or shoulders. There are three different fundamental approaches to achieve this aim:

1. The interferometer operates on an optical path difference of zero. The white-radiation strip is located roughly in the center of the first light-distributing surface and is thus projected onto the object surface approximately centrally. When the monochromatic source is turned off the white-radiation strip is identified by means of a contrast mask, for instance. Subsequently, the white-radiation source is stopped down or turned off whereupon the monochromatic source is used, which produces a high-contrast strip image on the object surface. The evaluated position of the white-radiation strip, which is stored in the computer, then defines the zero or reference strip in the strip field. With this provision it is possible to determine unambiguously the order of the interference fringes occurring in the case of monochromatic light.

2. As a result of the position of the first microtranslator the position of the zero-order white-radiation strip in the object field is changed. When the second microtranslator is moved it is possible to set also the direction and width of the fringes optionally, with the width corresponding to the sensitivity or sensitivity of the system. The narrower the strip at a given angle of incidence, the higher the sensitivity. The adjustment of the first microtranslator allows for an optional positioning of the zero-order white-radiation strip on the object surface by varying the optical path difference in the interferometer. On account of the shift of the zero-order white-radiation strip across the object surface also a discontinuous unknown object surface may be evaluated.

For a substantial improvement of the precision the phase relationship of the zero-order white-radiation strip may be determined for any point on the object surface by means of the phase shift method. This is not possible with the application of conventional measuring instruments. A further improvement of the precision is achieved if the phase relationship is determined by means of the monochromatic source after identification and storage of the position of the zeroth strip in various positions on the object surface. To this end the white-radiation illumination should be replaced by the monochromatic illumination as quickly as possible while an optical path difference of zero must be re-established. What is sensible is a computer-controlled masking or turning out of light source since in this manner both light sources may permanently remain in the operating state. In this manner it is possible to analyse complete object surfaces having high gradients.

3. It is also possible to use the white-radiation source along for an analysis of the object surface, by varying the optical path difference in the interferometer for moving the white-radiation strip across the object surface and by moving the specimen by means of a computer-controllable lifting table continuously or in discrete increments so as to project that piece of the object surface where the white-radiation strip is instantaneously located as sharply as possible. In such a system the phase may be set with each position of the specimen so as to increase the precision in measurement. The scanning of the object surface with the white-radiation strip is sensible or even necessary if the object surface presents steps or shoulders, is very irregular or strongly roughed so that the object surface goes beyond the range of focal depth of the optical projection system while it is hence not possible to evaluate the fringe pattern created by the monochromatic source.

In the event that triple prisms are employed it is expedient to use a beam splitter in the fringe-generating interferometer, which is disposed at an angle of roughly 45° and which consists of an optical flat carrying one beam-splitter layer each on either outside, which covers, however, the outer surface only in parts.

When a Fizeau interferometer is used to generate the fringes the necessary dual-beam interference may be created by spatial frequency filtering in the focal plane of the projection stage. This provision results in a particularly uncomplex arrangement which may be equally provided with a phase adjuster, but which, on account of the optical path difference which is persistently different from zero, is not suitable for operating on white-radiation so that the required reference fringe is reflected into the system by means of a beam splitter plate additionally disposed between the Fizeau interferometer and the grating whilst the reference fringe is generated in this case by the conventional projection of a line of light with another projection stage.

It is also possible to use an interferometer presenting a curved reflector surface, so as to achieve, if necessary, an optimum adjustment to the object surface.

In order to allow for an illumination of the object surface from two sides one light source each may be associated with the first and second light-distributing surfaces. In such a case the strips projected onto the object surface may present a different density, which produces a different sensitivity in projection with approximately the same angle of incidence.

With this provision the dual-sensitivity technique may be simultaneously applied. For an evaluation of the light reflected from the object surface it is possible to cause the light to emerge by means of an additional beam splitter. The latter then allows for an evaluation of the light coming from the object surface in the aforedescribed manner. When light-distributing surfaces are used which operate at the same time as reflecting diffraction and transmission gratings it is possible, for instance, to illuminate in the reflection mode and to observe in the transmission mode. In such a case the phase shift, which is required for the phase shift method, can be achieved by a computer-controlled vertical adjustment of the object surface.

It is also possible, however, to replace the position of the light source by the position of the detector module and to illuminate first from one side, e.g. first via the plane mirror, and then directly in a second measurement. This constellation allows for the detection of shaded surface areas.

For a variation of the angle of incidence of the illuminating beam onto the object surface it is possible to arrange the measuring system for a pivoting movement. The preferred fulcrum is then the focus on the object side. In the manner the image remains optically conjugated when the light-distributing surfaces together with the appertaining optical illuminating and projecting systems, inclusive of the light source and the image detector as inherently rigid module are pivoted simultaneously about the focus on the admission side of the projection stage, preferably through the same angles. It is thus possible to select the angle of incidence as a function of the desired sensitivity in measurement and of the surface nature of the object surface.

The application of a beam recombining system reducing lateral shear, or of a beam recombination system eliminating lateral sheer, allows for the achievement of a resolution of $\frac{1}{1000}$ of the effective wavelength in height/depth, or even better. Moreover, this provision involves a substantial augmentation of the depth/height gauging range.

In accordance with the invention a system is provided for analyzing the topography of the surface, which comprises a light source, at least one analyzing lens, a sample, a camera lens, a camera and a beam splitter system generating a lateral shear, which is additionally associated with the analyzing lens. As far as a given optical system is concerned the beam recombining system for reducing lateral shear effects may also be configured as a beam recombination system for eliminating lateral shear.

The light is transmitted from the light source to a lateral shear beam splitter system for splitting a light bundle into two sub-beams which are passed via the bundle splitter for splitting the wavefront or the amplitude into the analyzing lens. The sub-beams propagate in a parallel relationship, projecting two coherent light source images each in the image-sided focal plane of the analyzing lens. The analyzing lens guides the light of the two coherent light source images onto the sample which is located in the lens-sided focal plane of the analyzing lens. The sub-beams reflected on the sample are collected by the analyzing lens and partly pass through a beam splitter whereupon they arrive at a beam recombining system for reducing lateral shear, so as to create from the two sub-beams displaying lateral shear, which are reflected at the surface of the sample, two sub-beams which propagate preferably in a parallel relationship and which preferably do not present any lateral shear and no optical difference relative to one another, on average, so that they appear as one bundle of beams from a geometric-optical point of view. It is possible with this configuration that the lateral-shear producing beam splitter system, and equally the lateral-shear reducing beam splitter system, present each, on average, no mean optical optical path difference or a path difference other than zero. The two sub-beams recombined to for a beam bundle are projected through the camera lens onto the camera. The camera plane or at least one partial area of the sample surface are optically conjugate and hence one partial area of the sample surface is sharply projected. As it is possible to compensate the mean optical path difference down to zero it is possible to operate on white-radiation sources which output speckle-free images in general. It is also possible to make use of the small coherence length of white light for the depth/height detection on the sample.

For an application of tomographic techniques a movement of the sample relative to the system or a movement of the analyzing lens only is possible.

It is expedient for the analysis of curved surfaces to connect the lateral-shear reducing beam splitter system jointly with the camera lens and the camera to a single- or biaxial translation tracking means which permits a movement orthogonal to the axis of the recombined sub-beams. With these provisions it is possible to compensate the wandering of the sub-beams constituting the image of the sample surface as projected by the analyzing lens.

For the analysis of reflecting surfaces, e.g. of optical lenses, it is also possible, however, to displace the analyzing lens jointly with the sample relative to the remaining parts of the system in two directions and orthogonally to the optical axis of the analyzing lens. Even though this provision varies the sensitivity of the meas-uring system the strip spacing on the surface being analyzed is remains unchanged. What is expedient in this case is the aspect that a sub-beam or even the bisector of the two sub-beams may be incident on an area of the sample which happens to be within the depth of focus range of the analyzing lens at a right angle approximately, even with a curved surface. Hence the two sub-beams are re-reflected from the sample surface into the analyzing lens even in the case of reflecting samples, due to the direct reflection, while the relationship between the sample and the sample image is retained with an appropriately precise displacing movement—which means that tilting must not occur. Then the sensitivity of the measuring system can be derived from the measured amount of displacement.

The common phase shift technique is applicable, for instance for the evaluation of the surface. It is also possible, however, to derive the position and the topography of the covered sample area from the course of the contrast function of the interference in the camera plane, as will be explained in the following.

It is moreover possible that a lens is added to the analyzing lens for illumination of the sample, which presents an axial position parallel to the analyzing lens and which as a focal plane which coincides with the focal plane of the analyzing lens. With some engineering provisions, which are admittedly fairly extensive, this system permits a substantial increase of the sensitivity of the system in the analysis of the surface topography and also an analysis of reflecting surfaces, too. With such a design the two sub-beams are passed through the lens for sample illumination onto the sample, are reflected there and are then guided by the analyzing lens in the later-shear generating beam recombining system. A sample illuminating lens is associated with a preceding later-shear generating beam splitter system if the aforedescribed manner.

The lateral-shear producing beam splitter system, disposed ahead of the analyzing lens, can firstly be configured in the arrangement of a Michelson's interferometer including two retro-reflectors, which are arranged at a transverse offset relative to the optical beam axis, a splitter layer which splits the beam in dependence on polarization, and a nonpolarizing splitter layer. In this manner two coherent sub-beams are created. A translation adjusting means maybe associated with a retro-reflector for phase adjustment. Moreover, a retro-reflector may be connected to another translation adjusting means for setting the transverse offset. With such a configuration it is possible to provide a retro-reflector for displacement along the direction of beam propagation. This results in a shift of the effective light source images along the axis of beam propagation. With these provision it is possible to generate a defined strip structure, e.g. curved strips, in the analysis plane of the analyzing lens. This is expedient specifically for the analysis of approximately spherical areas.

The beam splitter system generating a lateral shear may secondly be configured in the arrangement of a Mach-Zehnder interferometer. This produces equally two coherent sub-beams presenting a lateral shear.

The lateral-shear producing beam splitter system may moreover be configured to include a partially transmitting layer and at least three plane reflectors.

This provision allows the production of two sub-beams from one light bundle.

The lateral-shear reducing beam recombining system may moreover present the design of an interferometer.

The light of the preferably extensive light source is incident on the splitter layer, which splits the beam in dependence on polarization, in the lateral-shear producing system, with a first sub-beam (C) being reflected and being incident on the second retro-reflector while the second sub-beam (D) passes through the splitter layer splitting in dependence on polarization and is then incident on the first retro-reflector. The sub-beam (C) reflected by the second retro-reflector now passes the non-polarizing splitter layer, enters the analyzing lens and arrives on the sample as sub-beam C'. The sub-beam (D) reflected by the first retro-reflector is so reflected at the non-polarizing splitter layer that a lateral offset of the sub-beam (D) relative to the sub-beam (C) occurs, and then passes, along with the first sub-beam (C), through the beam bundle splitter to arrive, via the analyzing lens, as a sub-beam (D') on the sample and to form, in cooperation with the first sub-beam/C') an interference pattern on the sample within the depth of focus range of the analyzing lens, which pattern, as a result of the mutually orthogonal polarization of the sub-beams, does not present, however, any visible strips. In the case of a plane sample, the observation through a polarizer disposed at an angle of 45° shows straight, equidistant and very narrowly spaced strips presenting a $\cos^2$ profile since the interfering beams enclose an angle $\angle$, e.g. of a few degrees. In the case of a curved sample curved strips are produced. In the event of a light source producing a great coherence in terms of time an extensive area pattern including a great number of strips is produced whereas a white-radiation source creates only a white-radiation interference pattern including a few closely adjacent strips.

Two sub-beams (C') and (D') are produced at different angles of incidence on the sample since two coherent images of the light source are produced in the image-sided focal plane of the analyzing lens, which coincides approximately with the plane of reflection of the retro-reflectors—in the case of triple reflectors this is the corner point—which images are unsymmetrical relative to the optical axis of the analyzing lens.

The light reflected at the sample surface is guided by the analyzing lens as sub-beam C" and as sub-beam D" back to the beam bundle splitter and is reflected there together with the latter beam. Now, in the lateral-shear reducing beam splitter system, both sub-beams are incident on a splitter layer splitting them in dependence on polarization, with the light of the sub-beam C" being subjected to reflection and being passed to the third retro-reflector from where it is passed on to the non-polarizing splitter layer, whereupon it is subjected to transmission. The light of the sub-beam D" passes through the splitter layer splitting the beam in dependence on polarization and through the plate and now arrives on the fourth retro-reflector and is incident on the non-polarizing splitter layer where it is reflected, whereupon the sub-beams D" and C" are recombined.

Following the transmission through a polarizer disposed at an angle of 45° the interfering sub-beams are projected through the camera lens onto a camera. With an adjusted arrangement and in the case of a plane sample aligned in an axially orthogonal relationship, a fringe-free interference pattern is produced in the camera plane. In the case of application of a monochromatic light source a slight tilt of the sample, e.g. through one degree, gives rise to one or a few interference fringes. A curved sample produces curved interference fringes, with the difference in height on the sample, which is related to a fringe interval, deriving from the angles of incidence of the sub-beams on the sample surface and the difference therebetween. The effective wavelength, which is operative all through the system, may typically be increased by a factor of 100 to 10,000 versus the light wavelength. The effective wavelength corresponds to the doubled appertaining amount of height in the case of a vertical adjustment of the sample, which is obtained by a displacement by precisely one fringe at one point of the sample. For an orthogonal incidence of the sub-beam, on the sample and with an incidence of the second sub-beam at an angle $\angle$ relative to the optical axis, the ratio Q of the effective wavelength to the light wavelength is obtained with an amount of $Q=2(1-\cos \angle)$. When a white-radiation source is used a plane sample oriented orthogonally relative to the axis and producing a sharp image generates interference phenomena all over the camera plane, but no fringes since the aforedescribed arrangement not only eliminates the lateral shear effect but reduces the mean optical path difference to approximate zero all through the camera plane in this specific case.

The use of an interferometer as lateral-shear reducing beam splitter system displaying the function of eliminating or strongly reducing the lateral-shear effect between the sub-beams substantially reduces the optical demands on the camera lens. To ensure the proper operation of the system, even with a more strongly reducing projection of the sample in the camera plan, camera lenses may be used whose numerical aperture is in the same order of magnitude as the aperture of the analyzing lens. When a lateral-shear reducing beam splitter system comprising a grating is used, however, at least one lens, i.e. the first lens in the projecting stage along the direction of light propagation, must be employed in correspondence with the imaging scale of the optical system, which lens produces a numerical aperture greater than that of the analyzing lens, in order to be able to project the light grating created on the sample to the real grating. Since, however, a comparatively great numerical aperture, with A=0.1, for instance, is aimed at for a sample diameter of 70 mm, for example, in order to achieve a high sensitivity in measurement, there are clear limits in terms of engineering provisions or from an economic point of view in the case of large-size samples which must be appropriately projected at a reduced scale onto the camera. For instance, if a light grating is created in the sample plane, which has a grating period of 10 μm, and if the sample is to be projected at a reduction by one order, one ought to use a real grating having a grating period of roughly 1 μm and a lens in the projecting stage, which presents a numerical aperture A of A>0.6. The way out by using a camera provided with a larger chip surface equally gives rise to engineering and economic constraints.

The lateral-shear producing beam splitter system and the lateral-shear reducing beam splitter system may also be configured as a compact interlaced dual Michelson's system including also the bundle splitter, so that the overall system comprises four or two retro-reflectors.

Moreover, the interferometer may e configured as a Mach-Zehnder interferometer.

The lateral-shear reducing beam splitter system may secondly be configured to have a partially transmitting layer and at least three plane reflectors. With these provisions it is possible to produce a combined bundle from two sub-beams.

The lateral-shear reducing beam splitter system may be configured as projecting system comprising a grating which is preferably located as transmission line grating in a projecting stage, e.g. in the common focal plane of the two lenses of a telescope. In this manner recombined coherent light beams are equally obtained, preferably at a mean lateral shear in the range of zero.

The lateral-shear reducing beam splitter system may be designed to comprise optical polarization elements.

The recombination of sub-beams may be realized in various successive stages:

by an optical polarizing separation of the beams from each other, by a spatially separate retro-reflection of each sub-beam independently on the other sub-beam, and by the locally coinciding reflection of a sub-beam with simultaneous transmission of a sub-beam, spatially separated from the sub-beam separation.

In the following, the invention will be described by the example of embodiments, without any restriction of the general inventive idea, referring to the enclosed drawing which explicit reference is made to in all other respects as far as the disclosure of all inventive details is concerned which are not explained in more details in the text. In the drawings:

In the Figures described hereinbelow respectively equal or corresponding items are identified by the same reference numerals so that a repeated explanation will be omitted and merely variations of the embodiments shown in these Figures, versus the first embodiment, will be explained:

FIG. 1 illustrates a system operating on the basis of a multiline reflecting diffraction grating and a holographic reflecting grating.

Figure 1:
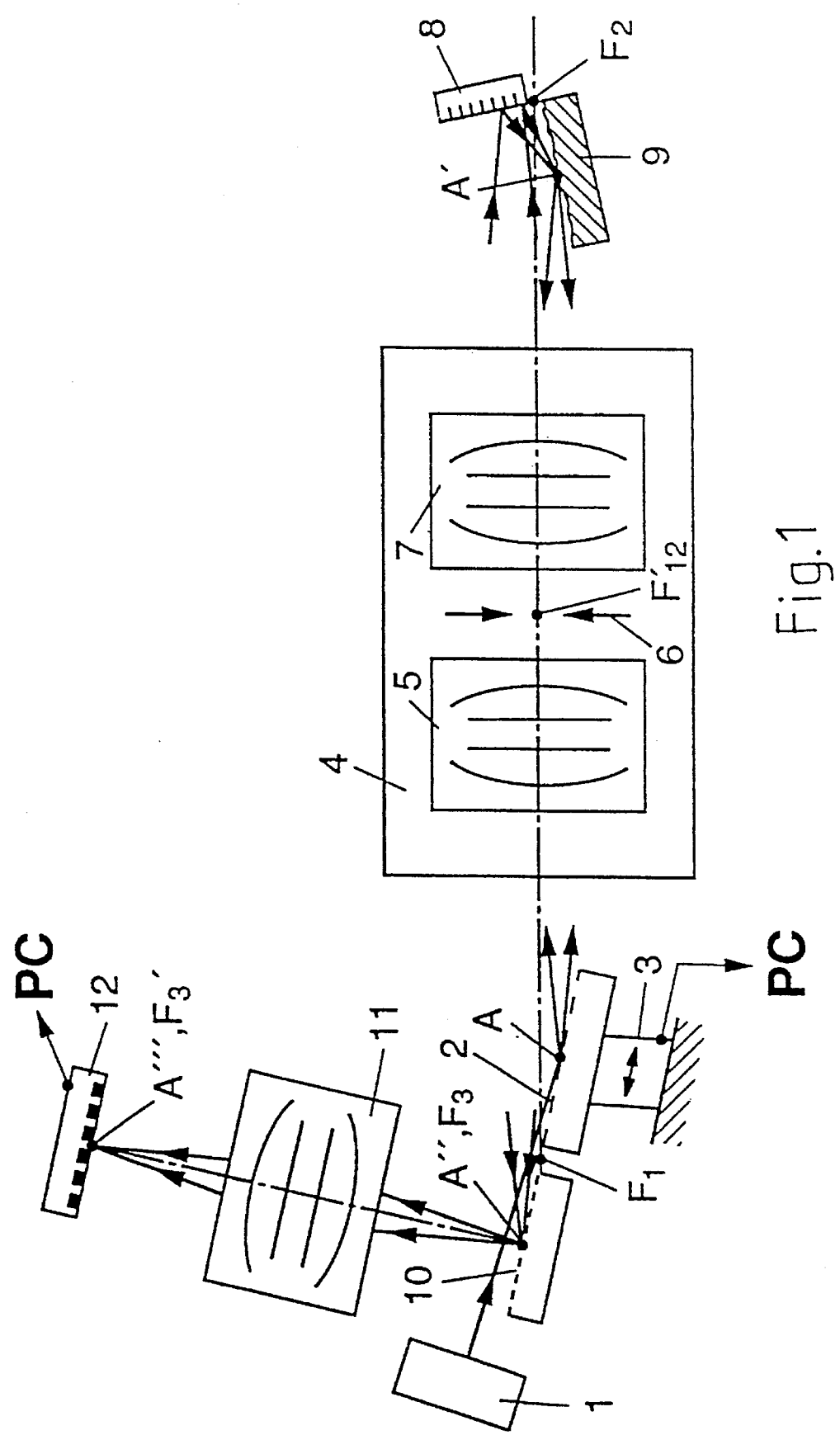
FIG. 1 shows a system operating on a multiline reflecting diffraction grating and a holographic reflecting grating.

The monochromatic and divergent light cone, which emanates from a laser light source 1 including an integrated rotating focussing screen and a collimator, is incident on a multiline reflecting diffraction grating 2. A first part of the cone is reflected directly. A second cone is created by the diffraction of the first negative order.

Both cones may enclose an angle of roughly 2°, for instance. The multiline reflecting diffraction grating 2 is connected to a computer-controlled actuator 3 which adjusts the grating in the grating plane, transversely with respect to the grating lines, by fractions of the grating period, for the application of the phase shift method. The two cones arrive in the projection or optical stage 4 which comprises the two lens elements 5 and 7 as well as the slit diaphragm 6. The object-sided focus F1 of the lens element 5 is in a plane which is defined by the multiline reflecting diffraction grating 2. The image-sided focus of the lens element 5 and the object-sided focus of the lens element 7 coincide with each other in point F'12. The focal lengths of the lens elements 5 and 7 are equal and thus constitute a 4 f-type system. This projection or optical stage 4, which is formed by the two lens elements 5 and 7, projects the multiline reflecting diffraction grating 2 via the plane mirror 8 in an optically conjugated form onto the object surface 9, whilst the plane mirror 8 and the object surface 9 enclose a right angle so as to create a virtual roof edge on which the focus F2 is located. Hence a compensating plane also contains the focus F2 via the object surface 9. On this condition, the point A on the multiline reflecting diffraction grating 2 is projected as A' onto the object surface 9 in an optically conjugated manner such that the image of the multiline reflecting diffraction grating 2 will be created on the object surface 9. The spatial frequency filtering by means of the slit diaphragm 6 produces the effect that only two diffraction orders, i.e. the zeroth and the first negative one, may pass the projection stage 4. With that a pure dual-beam interference distribution is created on the object surface, which presents the sinusoidal profile which is required for a high precision in evaluation. Depending on the positioning of the slit diaphragm 6 the positive or negative first order of diffraction may be involved.

The object surface 9 is optically sharply projected via the projection stage 4 onto a holographic reflecting grating 10. With that the point A" is optically conjugated with point A'. The grating period of this holographic reflecting grating 10 has been so selected that the first negative order of diffraction extends approximately along the direction of the surface normal of the holographic reflecting grating 10 in the case of this oblique incidence of light. For an angle of incidence of roughly 84° a grating constant of roughly 1570 lines per millimeter (l/mm) derives therefrom at a wavelength of 633 nm. The light diffracted in the first order of diffraction is projected, by means of an optical stage or projecting system 11, onto a CCD camera 12 which is connected to a personal computer. The point A'" on the CCD camera 12 of that system is optically conjugated with point A" on the holographic grating 10. Now the computer-controlled actuator 3 is operated to adjust the reflecting diffraction grating 4 in three or four increments, in one quarter of the grating constant each, while one interference image is recorded and stored in the personal computer. The surface topography of the object surface 9 is subsequently detected by means of the common phase shift evaluation method.

Figure 2:
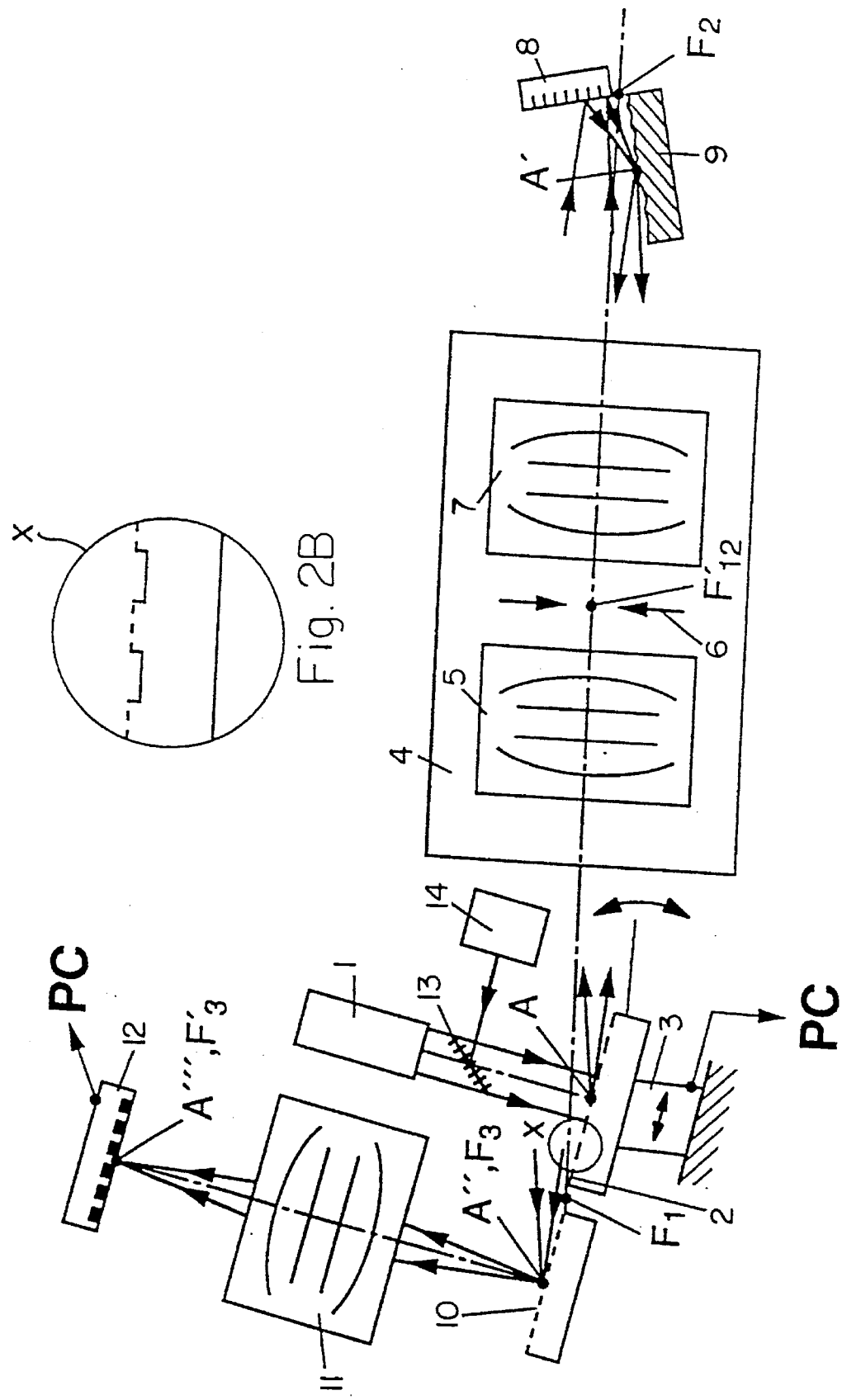
FIG. 2A is a view of a system operating on the basis of a first multiline reflecting diffraction grating on whose reflecting bars a fine reflection grating is imprinted as shown in enlarged view in FIG. 2B, and which employs a second holographic reflecting grating for feeding the beam out.

The aforedescribed system presents a sensitivity of approximately 18 μm/2*Pi. This corresponds to an effective wavelength of 36 μm. FIG. 2A illustrates a system operating on the basis of a first multiline reflecting diffraction grating onto whose reflecting bars a fine reflecting grating is imprinted as shown in enlarged view of X in FIG. 2B while a second holographic reflecting grating is used to feed out the beam.

The monochromatic and divergent light cone, which is radiated from a laser light source 1 with an integrated focussing screen and a collimator, passes through a beam splitter 13 via which a computer-controlled projector 14 reflects a line of light into the system, and is then orthogonally incident on a multiline reflecting diffraction grating 2 onto which the line of light is sharply projected, too. The multiline reflecting diffraction grating 2 presents for instance a grating period of 180 μm. A fine grating structure of 1570 l/mm, for instance, is provided on the reflecting bars of the grating. With this provision the collimated light, which is incident on the multiline reflecting diffraction grating 2, is diffracted at an angle of approximately 84° due to the diffracting power of the fine structure. The multiline reflecting diffraction grating 2 is connected to a computer-controlled actuator 3 which adjusts the grating in the grating plane, in a direction transversely with respect to the grating lines, by fractions of the grating constant of 180 μm, e.g. by increments of 45 μm each, for the application of the phase shift method. The diffracted light arrives in the projection stage 4 including the two lens elements 5 and 7 as well as the slit diaphragm 6. The object-sided focus F1 of the lens element 5 is located in a plane defined by the multiline reflecting diffraction grating 2. The image-sided focus of the lens element 5 and the object-sided focus of the lens element 7 are coincident with each other in F'12. The focal lengths of the lens elements 5 and 7 are equal, thus forming a 4 f-type arrangement. This projection stage 4, which is formed by the two lens elements 5 and 7, projects the multiline reflecting diffraction grating 2 via the plane mirror 8 in an optically conjugated form onto the object surface 9, whilst the plane mirror 8 and the object surface 9 enclose a right angle so as to create a virtual roof edge on which the focus F2 is located. Hence a compensating plane also contains the focus F2 via the object surface 9. On this condition, the point A on the multiline reflecting diffraction grating 2 is projected as A' onto the object surface 9 in an optically conjugated manner such that the image of the multiline reflecting diffraction grating 2 will be created on the object surface 9. The spatial frequency filtering by means of the slit diaphragm 6 produces the effect that only two diffraction orders may pass the projection stage 4. With that a pure dual-beam interference distribution is created on the object surface, which presents the sinusoidal profile which is required for a high precision in evaluation.

The object surface 9 is sharply projected via the projection stage 4 onto a holographic reflecting grating 10. With that the point A" on the holographic reflecting grating 10 is optically conjugated with point A'. The grating period of this holographic reflecting grating 10 has been so selected that the first order of diffraction extends approximately along the direction of the surface normal of the holographic reflecting grating 10 in the case of this oblique incidence of light. For an angle of incidence of roughly 84° a grating constant of roughly 1570 lines per millimeter derives therefrom at a wavelength of 633 nm. The light diffracted in the first order of diffraction is projected, by means of a projecting system 11, onto a CCD camera 12 which is connected to a personal computer. The point A''' on the CCD camera 12 of that system is optically conjugated with point A" on the holographic grating 10. The line of light, which is established by the computer-controlled projector 14, is adjusted so as to completely illuminate precisely one or only very few ones of the reflecting bars of the grating at the grating period of 180 μm. The reflecting bars are sharply projected onto the object surface 9. This provisions allows for a detection whether the object surface 9 has been correctly positioned in the vertical direction, when the laser light source 1 is turned off, and whether the object surface 9 presents a continuous surface. Subsequently the computer-controlled projector is turned off and the laser light source is turned on. The projection strips are thus produced on the object surface 9.

Now the computer-controlled actuator 3 is used to adjust the reflecting diffraction grating 2 in three or four increments, in one quarter of the grating constant each, while one interference image each is recorded and stored in the personal computer. The surface topography of the object surface 9 is subsequently detected by means of the common phase shift evaluation method. In the case of a discontinuous object surface 9 the computer-controlled projector may define a zero-order strip on the object surface 9, thus determining the order of the projection strips.

Figure 3:
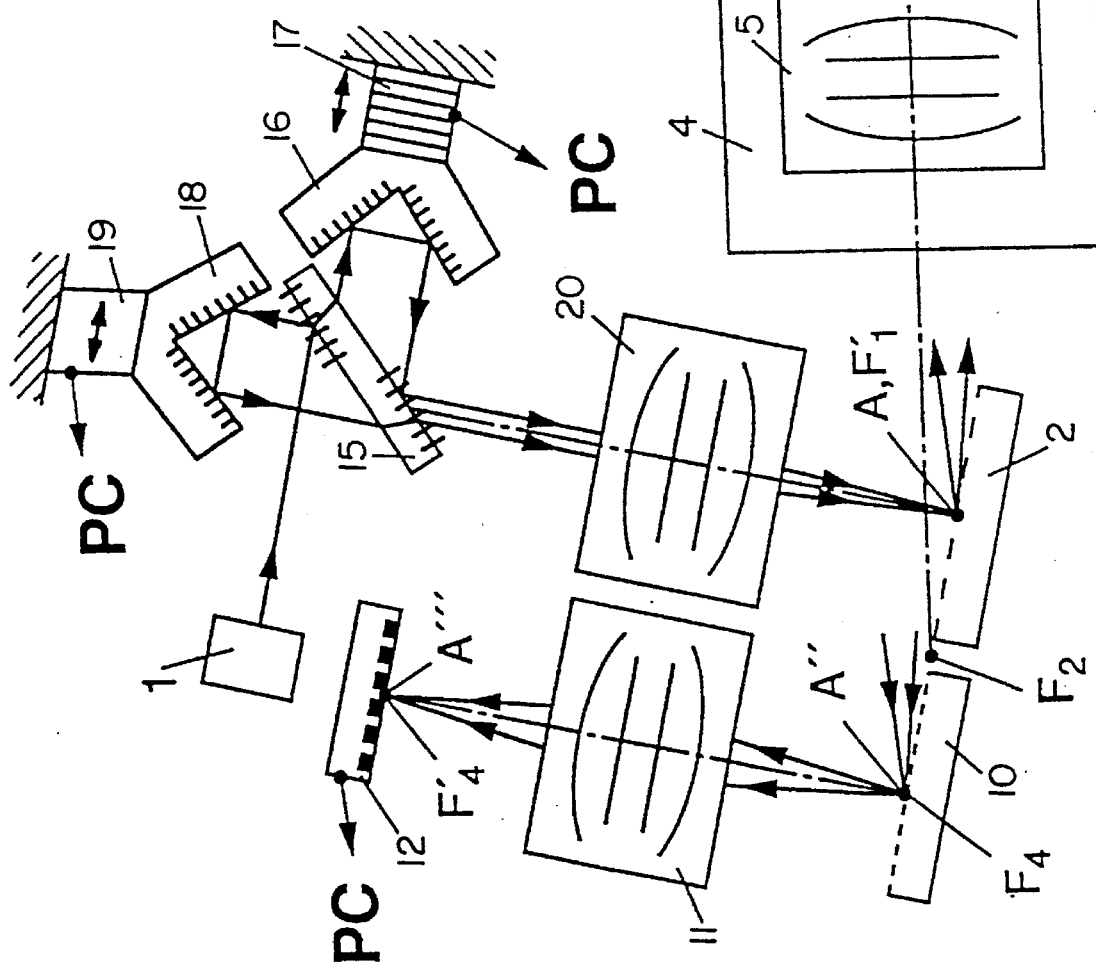
FIG. 3 shows a system operating on an interferometer for fringe generation.

FIG. 3 illustrates a system operating on the basis of an interferometer for fringe generation.

The light cone radiated from a light source 1, which comprises firstly a laser light source with an integrated rotating focussing screen and a collimator and second a white-radiation source, is incident on a beam splitter plate 15 in the form of an optical flat, which is disposed at an angle of 45°, for being split there into a transmitted beam and a reflected beam. The transmitted beam is incident on a roof edge reflector 16 which is connected to a computer-controlled piezo actuator 17. Instead of that piezo actuator 17 also a micrometer screw actuator 17 with a computer-controlled stepping motor may be employed. The piezo actuator or the micrometer actuator 17, respectively, serves to achieve a computer-controlled phase adjustment in order to permit the application of the phase shift method. The reflected beam is incident on a roof edge reflector 18, which is equally connected to a computer-controlled piezo actuator 19 serving for a transverse adjustment of the roof edge reflector 18. With that it is possible to adjust the density of the strips. The light beams reflected from the two roof edge reflectors are incident again on the beam splitter plate 15, thus creating two mutually interfering light beams which are focused through the lens element 20 into the plane of the holographic grating 2. The focus of the lens element 20 is located in that plane so that here interference fringes of the same inclination are generated. The interferometer which is composed of the beam splitter plate 15 and the roof edge reflectors 16 and 18 is adjusted here to the optical path difference of zero.

The light source operates under computer control. In this manner it is possible firstly to operate the laser light source independently, and secondly to operate only the white-radiation source. When the laser light source is now turned off and the white-radiation source is turned on it is now possible to determine whether the object surface 9 has been correctly positioned in the vertical direction, and whether the object surface 9 presents a continuous surface. Subsequently the white-radiation source is turned off and the laser light source is turned on. Then the projection strips are created on the object surface 9.

The computer-controlled piezo actuator 17 may be used to adjust now the roof edge reflector 16 in three or four increments, respectively within one eighth of the light wavelength, while one interference image is recorded each and stored in the personal computer. The surface topography of the object surface 9 is subsequently determined by means of the common phase shift evaluation method. In the case of a discontinuous object surface 9 the white-radiation source may be used to determine the order of the projection strips. It goes without saying that instead of the piezo actuators also micrometer screws may be used which are operated by motors.

If the object surface to be analysed has high gradients very dense fringes are produced on the object surface. By means of the phase shift evaluation method one can now determine whether the fringe density is excessively high. In such a case the roof edge reflector 18 may be adjusted in the transverse direction by means of the piezo actuator 19 so as to reduce the density of the interference fringes in order to render evaluation possible. The assessment of the object surface and the determination of the optimum fringe density may be realized under computer control via the evaluation of the fringe contrast function.

Figure 4:
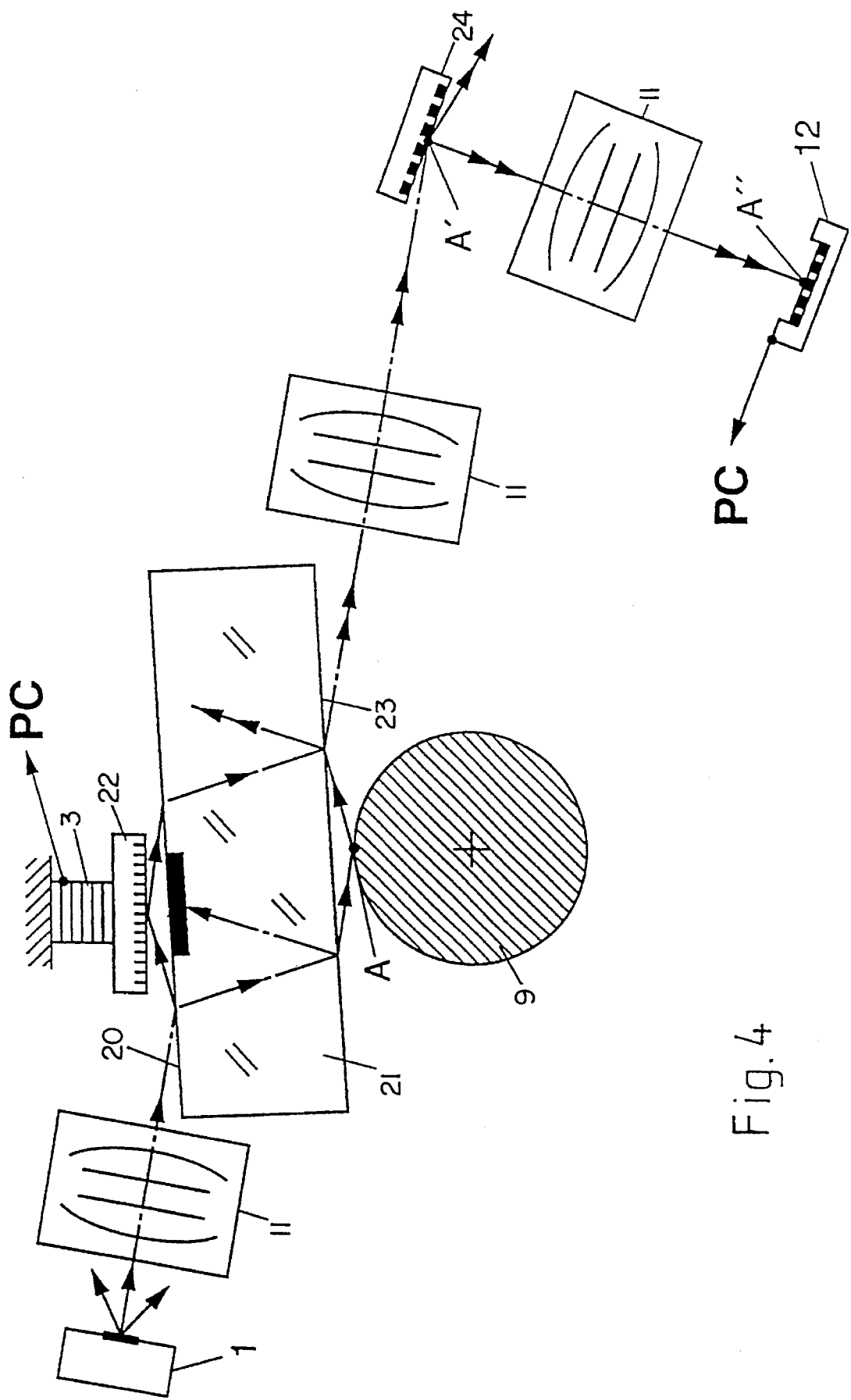
FIG. 4 illustrates an inventive system which is particularly well suitable for surfaces having small dimensions or for external cylindrical surfaces.

FIG. 4 illustrates a system which is particularly well suitable for surfaces having small dimensions or for external cylinder surfaces.

The monochromatic light cone radiated from a laser light source 1 comprising an integrated rotating focussing screen is collimated in a collimator 2. The light cone so formed is incident on the surface 20 which can be a beam-splitter surface of an optical flat 21. A first part of the cone is reflected and is incident on the plane mirror 22 which is connected to a computer-controlled piezo actuator 3. Following reflection at the plane mirror 22 the light cone re-enters the optical flat 21. The second part of the cone passes through the optical flat 15 and arrives at the object surface 9, is reflected there as object beam and is returned to the second surface 23 of the optical flat 21. There it is combined with the first partial cone which constitutes a reference beam. Now a joining lens element 11 for 1:1 projection produces an optically sharp image of the object surface 9 on a holographic reflecting grating 10. The grating period of that holographic reflecting grating 24 is so selected that the first diffracting system extends approximately along the surface normal of the holographic reflecting grating 24 at the oblique light incidence. With an angle of incidence of roughly 84° and at a wavelength of 633 nm a grid period of approximately 1570 lines per millimeter is thus obtained. The light diffracted in the first diffraction system is the projected onto a CCD camera 12 by means of a projection system 11, which camera is connected to a personal computer. The piezo actuator 3 is then used to adjust the phase in the interferometer in three or four increments while one interference image each is recorded and stored in the personal computer. Then the common phase shift technique is employed to determine the surface topography.

Figure 5:
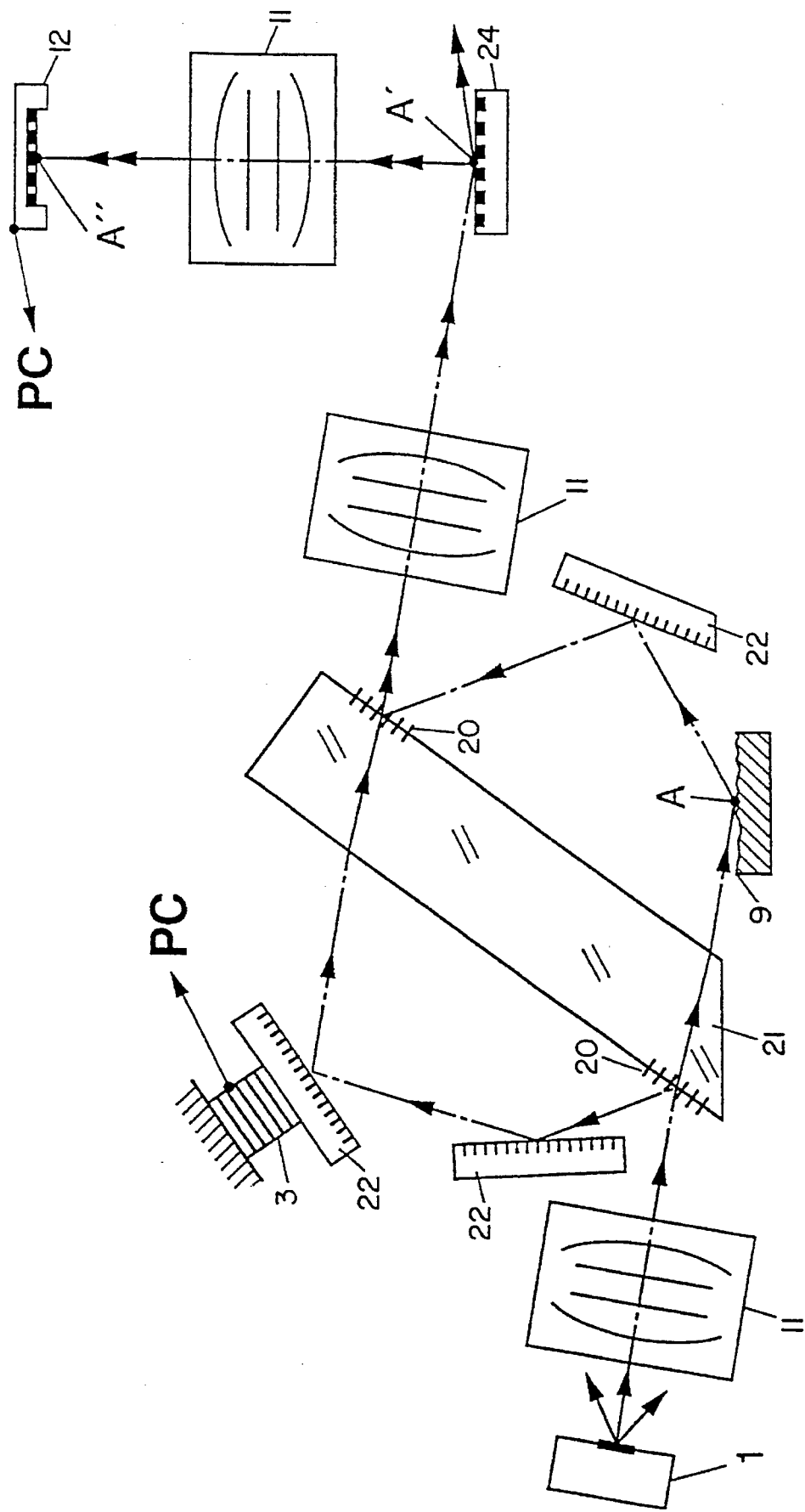
FIGS. 5 and 6 show systems particularly appropriate for extensive objects.
Figure 6:
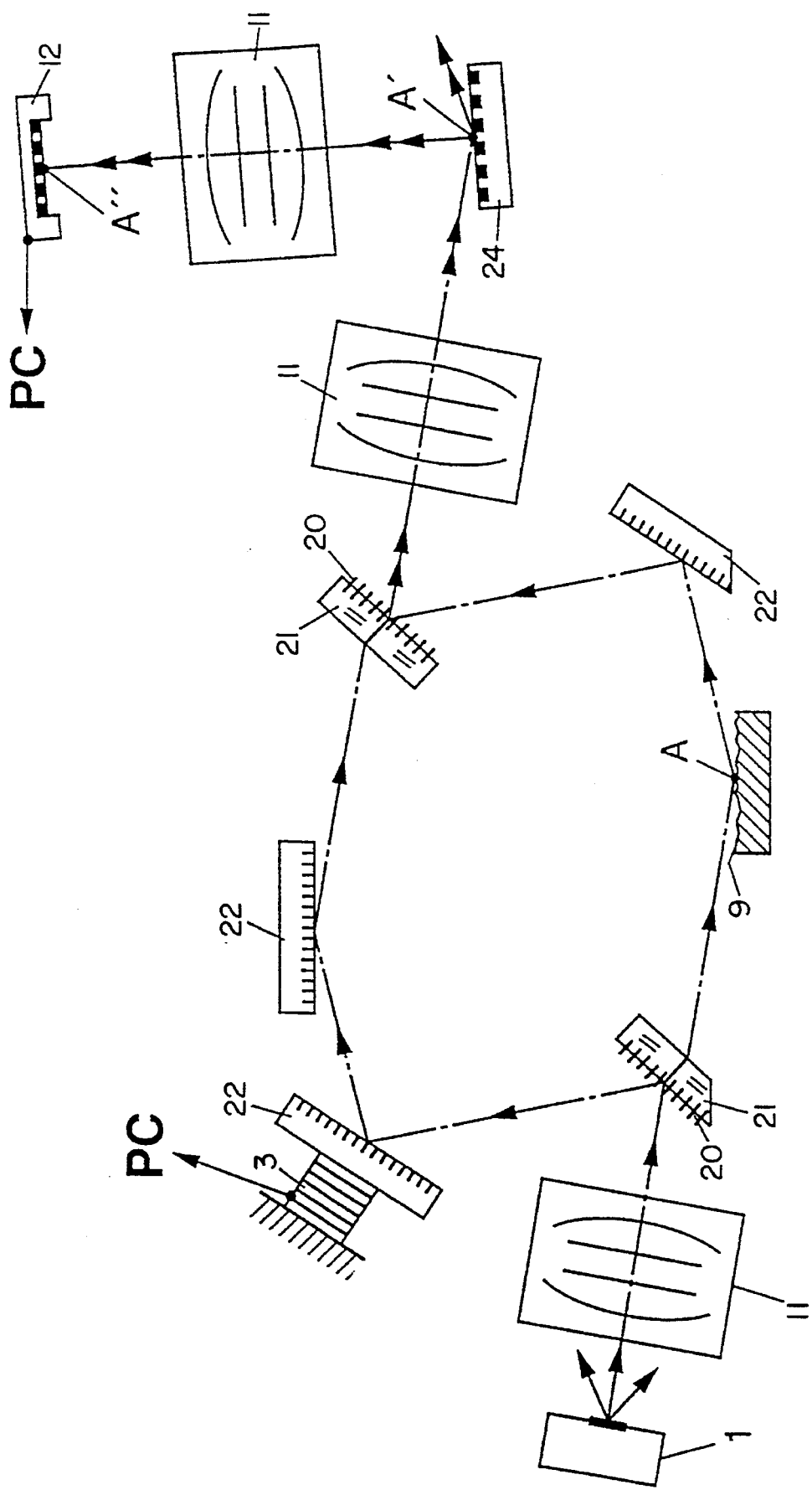

The FIGS. 5 and 6 show systems which are specifically appropriate for use with extensive objects.

Figure 7:
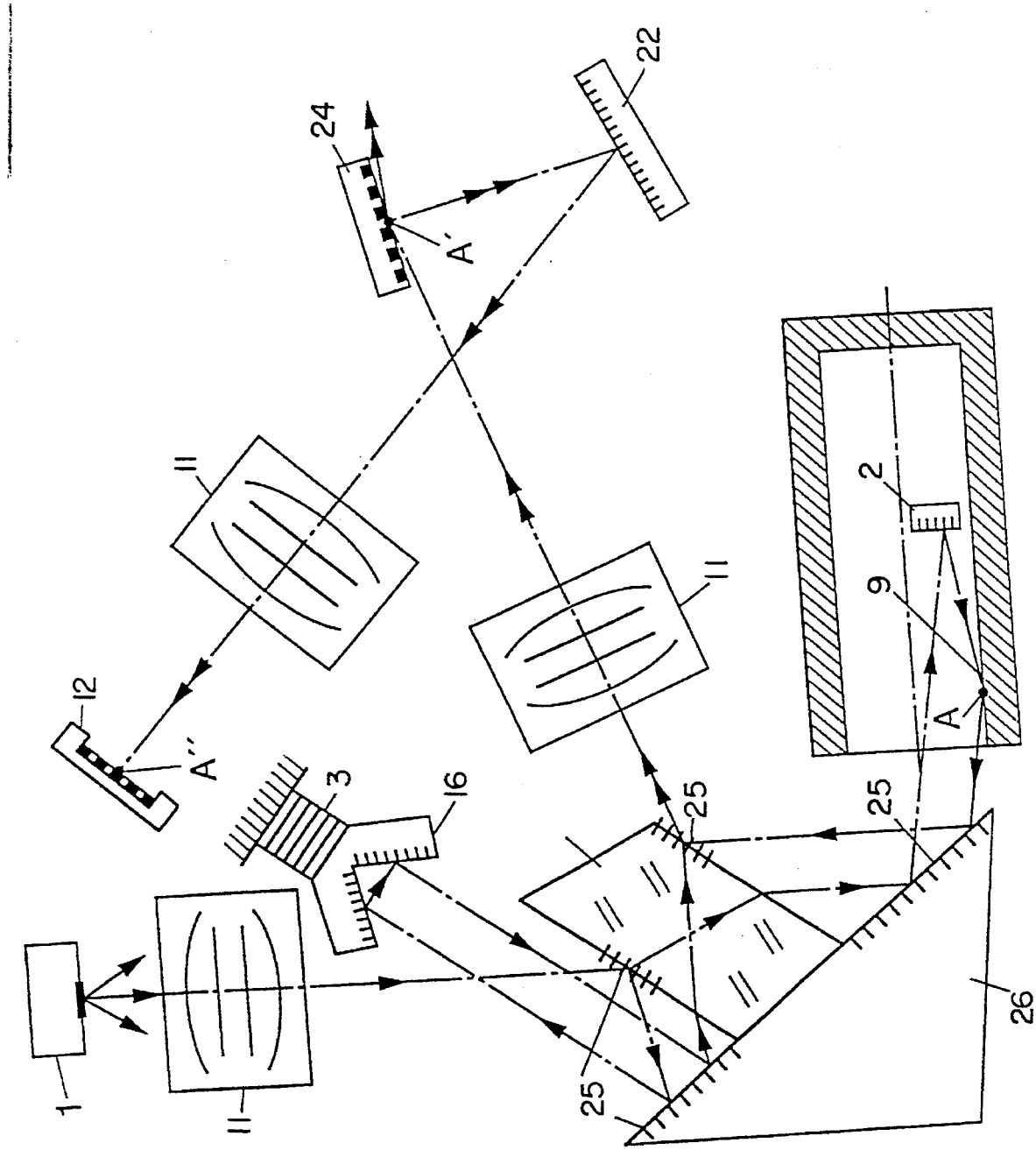
FIG. 7 illustrates a system which is suitable specifically for the analysis of inside surfaces.

FIG. 7 is the view of a system which is particularly well suitable for analysing inside surfaces. It shows new elements in the form of a reflecting face 25 disposed on a reflector mount 26 which is rigidly connected to an optical flat. A path-folding mirror 27 is provided inside the body to be measured.

Figure 8:
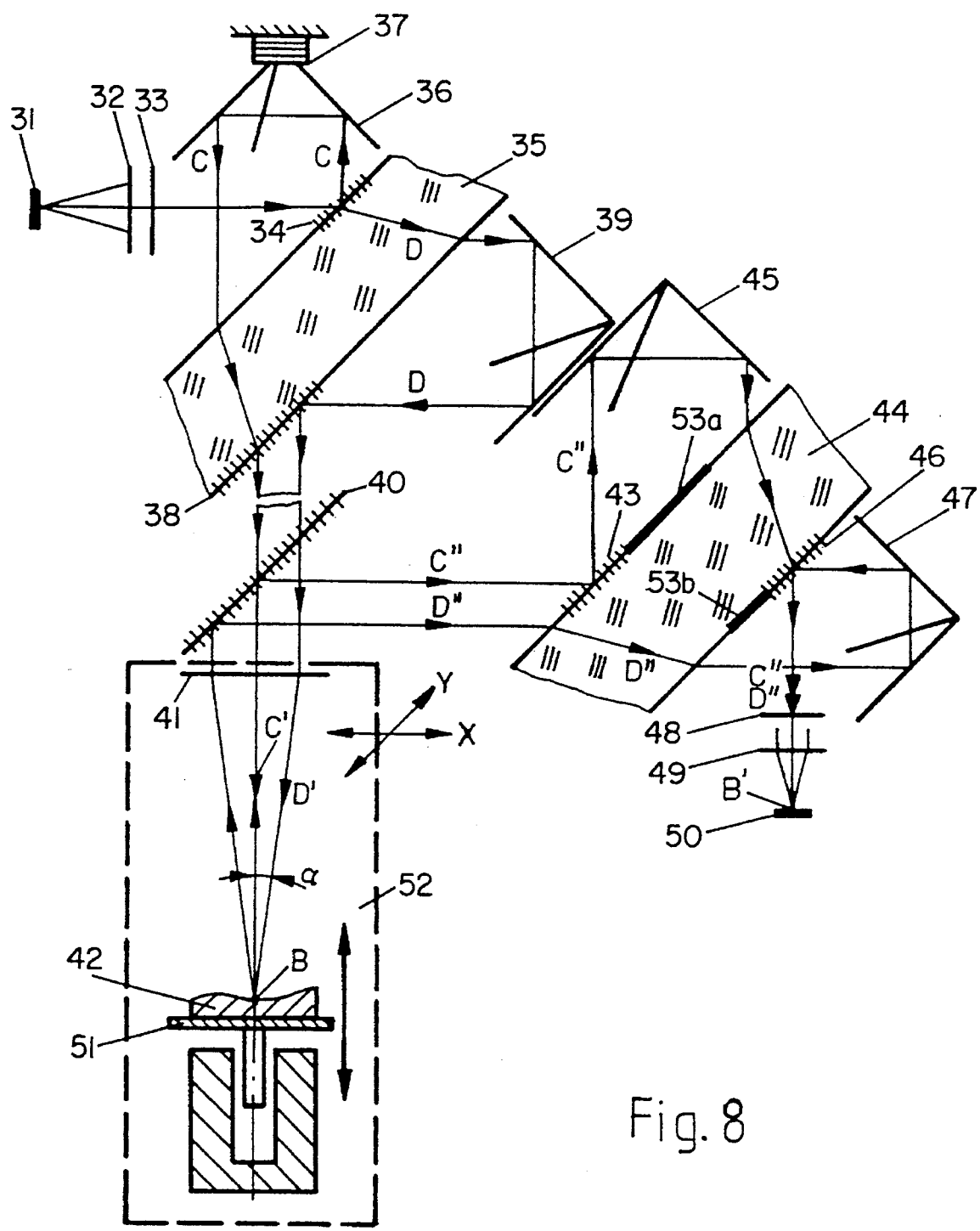
FIG. 8 is a view of the system for an analysis of the surface topography of polished and curved surfaces.

FIG. 8 illustrates a system which is suitable specifically for polished and curved surfaces. The light emitted by a laser light source 31 comprising an integrated rotating focussing screen is weakly focussed by an illuminating lens 32 and passes through a polarizer 33 disposed at an angle of 45°, so as to create a linearly polarized light. The linearly polarized light is incident on the polar-izing layer 34 provided on an optical flat 35, is partially reflected there for producing a sub-beam C of vertical polarization, and then arrives on the polarization-retaining triple reflector 36 which is connected to a computer-controlled translation adjusting element 37. Following the reflection at the triple reflector 36, the sub-beam C passes through the optical flat 35 including the non-polarizing splitter layer 38, and retains its vertical polarization. The light transmitted through the polarizing layer 34 then passes, as sub-beam D of parallel polarization, through the optical flat 35, is reflected by the polarization-retaining triple reflector 39, is subjected to reflection at the non-polarizing splitter layer 38, and propagates in a parallel polarization state in a parallel geometric relationship with the sub-beam C. The light source 31 is approximately projected into the triple reflectors 36 and 39.

Both sub-beams C and D pass through the bundle splitter 40 and are guided through the analyzing lens 41 onto the sample 42. Seen from the site of the analyzing lens, two coherent light source images are formed. With this configuration the axis of the sub-beam C is located on the optical axis of the analyzing lens 41. The axis of the sub-beam D is transversely offset from the axis of the analyzing lens. The two light source images are separated e.g. by 30 mm in the case of a lens having a focal length of 50 mm. Two sub-beams C' and D' are generated which are incident of the sample 42, enclosing an angle of $\angle=3.4°$. On account of the different polarizations of the two sub-beams interference phenomena cannot be observed. Since, however, two sub-beams of same polarization are caused to interfere with each other in the continuing projection, one may assume here two bundles capable of interfering, so as to explain this effect. With a light wavelength of 633 nm a fringe pattern having a fringe line spacing of 10.6 µm is produced on a plane sample orthogonal relative to the axis. A displacement of the sample along the axial extension of the lens by 350 µm produces a shift of the interference fringe field by one fringe width. Hence the effective wavelength amounts to 700 µm.

Following reflection on the sample, the sub-beam C" and D" are passed via the bundle splitter 40 onto the polarizing splitter layer 43 located on the optical flat 44. The sub-beam C", which presents a vertical polarization, is reflected and the sub-beam D", which presents a parallel polarization, is subjected to transmission at the polarizing splitter layer 43. The sub-beam C" is reflected at a triple reflector 45, and passes through the optical flat 44 and the non-polarizing splitter layer 46. The sub-beam D" equally passes through the optical flat, is reflected at the triple reflector 47 and arrives at the non-polarizing splitter layer 46 where it is reflected. The two sub-beams C" and D", in the form of co-linearly propagating bundles, are recombined on a polarizing filter 48 disposed at an angle of 45°, which has the function of an analyzer, so that two sub-beams of same polarization are produced which pass via the camera lens 49 and reach the CCD matrix 12 connected to a computer. The sample is connected to a computer-controlled lifting table 51 which permits a sample displacement by optionally selectable height increments. The sample 42 may thus be moved layer-wise through the depth of focus range of the analyzing lens. For an analysis of reflecting surfaces the great-aperture analyzing lens 41, jointly with the sample 42, is connected to an X-Y translation table 52. The X-Y translation table 52 is always moved in a manner that the two sub-beams C' and D' are incident on the reflecting surface of the sample 42 in an approximately orthogonal manner. Then the effective wavelength may be derived from the distance of movement of the X-Y translation table 52 and from the characteristics of the optical system. The evaluation of the distribution of contrast of the interference effects furnishes the surface topography of the sample. For an improvement of the precision in measurement, a white-radiation source may be alternatively used instead of the extensive light source 31; this white-radiation source presents only a very small visibility range for the interferences in terms of height/depth on account of its wide light wavelength spectrum and the appertaining short coherence length. As a result a very precise criterion is available for determining heights and/or depths.

The light-absorbing layers 53a and 53b avoid the re-reflection into the optical system.

Figure 9:
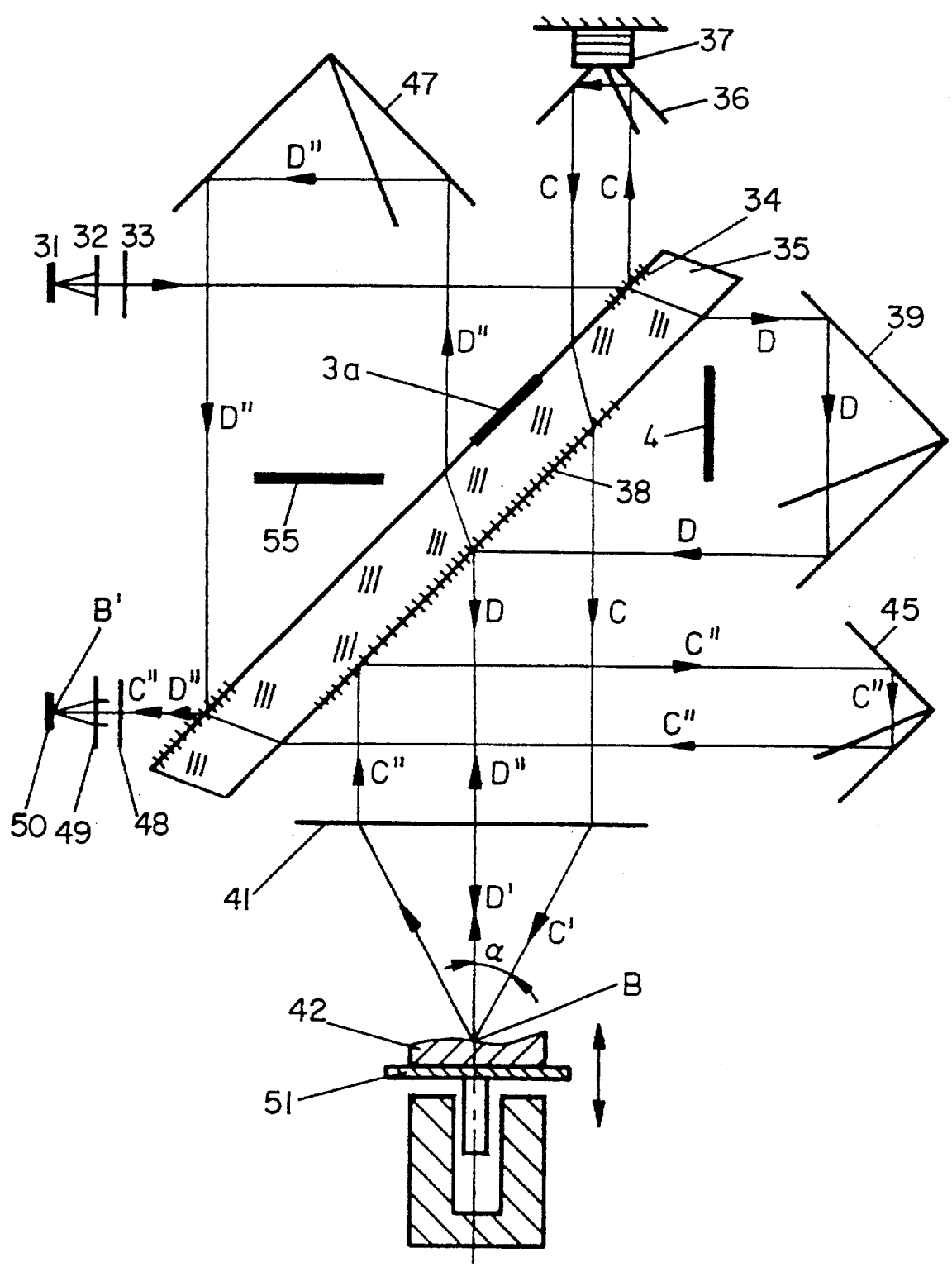
FIG. 9 illustrates a system for analyzing light-scattering surfaces.
Figure 10:
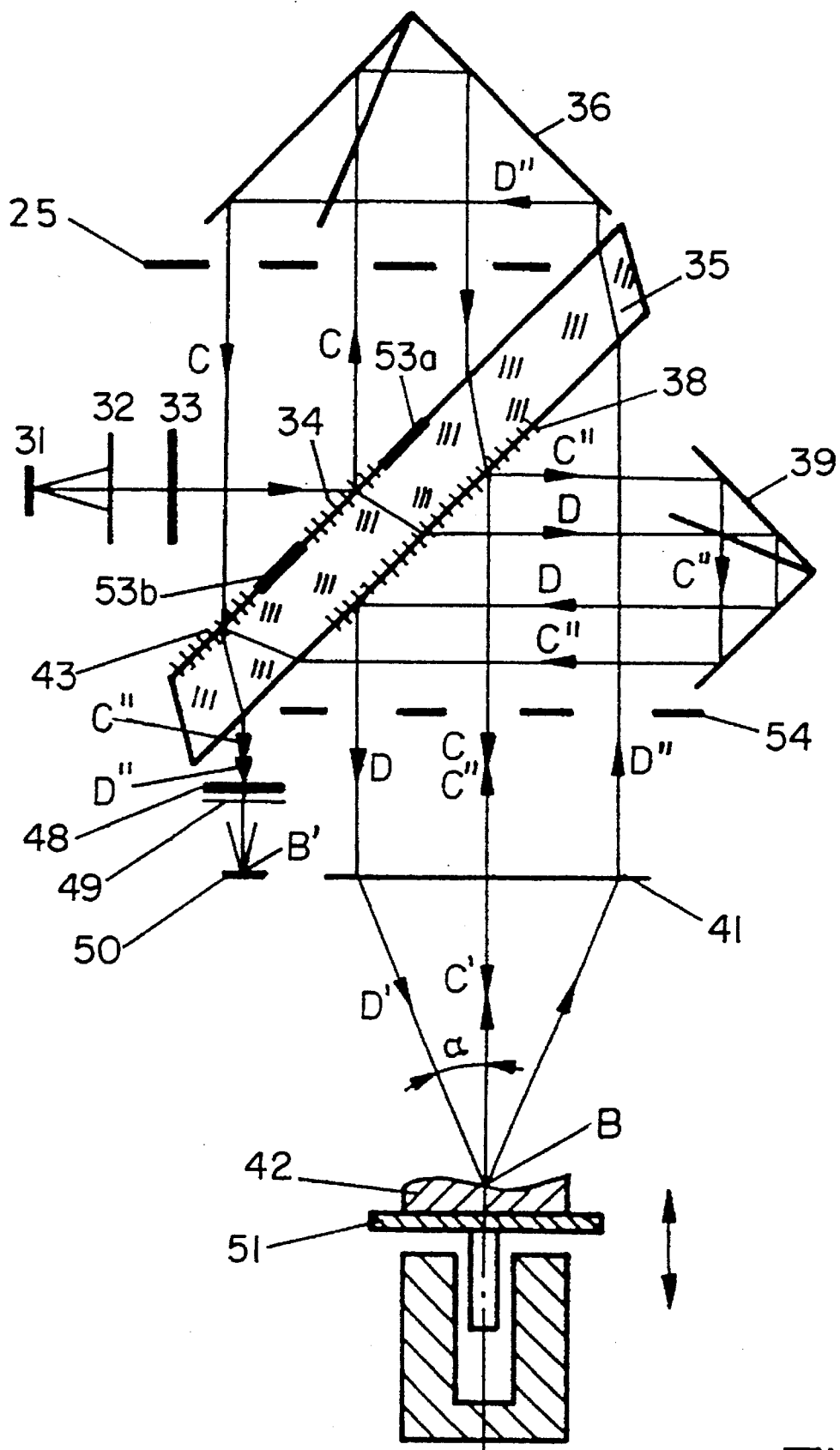
FIG. 10 is a view of an uncomplex system including as little as two triple reflectors which are specifically well suitable for light-scattering surfaces.

FIG. 10 illustrates an uncomplex system including as little as two triple reflectors, which is appropriate specifically for light-scattering surfaces. Owing to the compensating effect of the optical circuit for the optical path difference, the employment of a white-radiation source is unproblematic. In addition to the view according to FIG. 9, the light-absorbing layers 53a and 53b and the shielding shutters 54 and 55 change the occurrence of undesirable sub-beams and multiple reflections.

Figure 11:
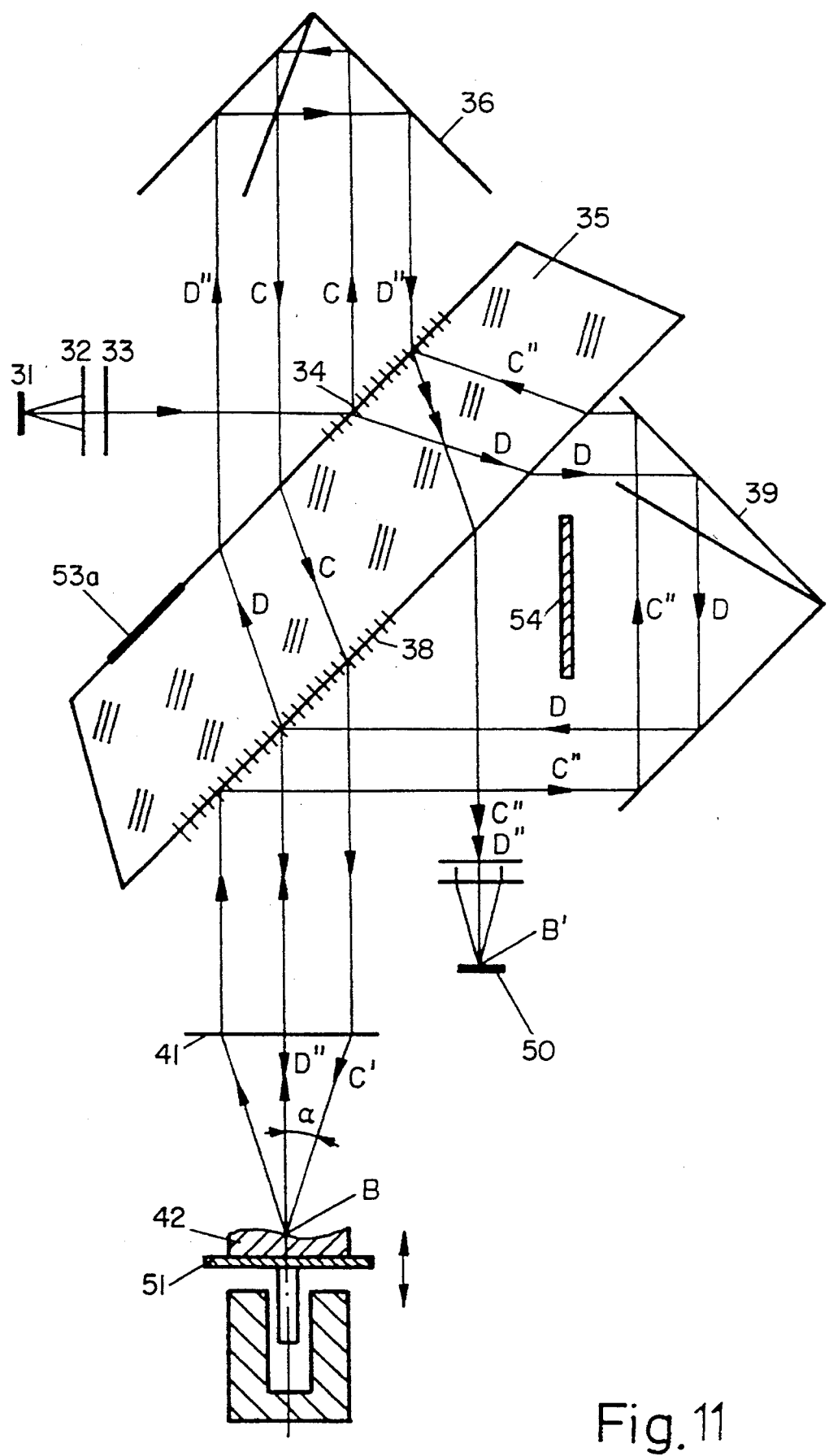
FIG. 11 shows a modification of the system according to FIG. 10.

FIG. 11 is a view of a system modified by contrast to the system according to FIG. 10, which is particularly well suitable for light-scattering and reflecting surfaces presenting great surface gradients and reduced lateral dimensions.

We claim:

1. Apparatus for topographic analysis of a surface comprising at least one light source for radiating divergent light, a first light-distributing surface of a first diffraction grating for receiving light from the at least one light source and for reflecting a first bundle of light under normal optical conditions and a second bundle of light formed by diffraction of the first order, a first optical stage for projecting the first and second bundles from the first light-distributing surface in an optically conjugated form onto an object surface to be analyzed of a sample, light representing the object surface being sharply projected via the first optical stage onto a second light-distributing surface of a second diffraction grating, and a detector for receiving diffracted bundles of light from the second light-distributing surface projected by a second optical stage for detecting radiation enabling topographic analysis of the object surface.

2. Apparatus according to claim 1, wherein the at least one light source is a light source module having a rotating focusing screen on which an extended spot is illuminated.

3. Apparatus according to claim 1, wherein at least one of the first and second diffraction gratings is at least one of a multiline grating, reflecting diffraction grating and holographic reflecting grating, and is located on one of a straight and a curved surface.

4. Apparatus according to claim 1, wherein at least one of the first and second diffraction gratings has a grating period selected so that an obliquely incident light beam in the first order of diffraction is radiated substantially orthogonally relative to a grating surface.

5. Apparatus according to claim 1, wherein at least one of the first and second diffraction gratings is a multi-line reflecting diffraction grating having a grating structure located on a surface matched with the object surface.

6. Apparatus according to claim 5, wherein the object surface is convex and the grating structure is disposed on a concave surface.

7. Apparatus according to claim 1, wherein at least one of the first and second light-distributing surfaces have grating structures with different grating periods.

8. Apparatus according to claim 7, wherein on each line of the grating structures having different grating periods include a small grating period and fine gratings have a higher grating period.

9. Apparatus according to claim 8, wherein the small grating period include 10 lines/mm and the higher grating period include 1,000 lines/mm.

10. Apparatus according to claim 1, wherein at least one of the first and second light-distributing surfaces is connected to a computer-controlled microtranslator for enabling application of a phase shift technique.

11. Apparatus according to claim 1, further comprising a reflector associated with the object surface and arranged in a substantially orthogonal relationship thereto so that one of a compensating plane through the object surface and a combination of the reflector and the object surface form a roof edge.

12. Apparatus according to claim 1, wherein the first optical stage is configured as a 4 f-type system.

13. Apparatus according to claim 1, wherein the second optical stage is disposed at a same angle as the first optical stage so as to create an arrangement which is symmetrical relative to the object surface in terms of an axial provision of the first and second optical stages.

14. Apparatus according to claim 1, wherein the at least one light source is interchangeable in position with a position of the detector so as to enable coverage of surface areas which are shaded.

15. Apparatus according to claim 1, wherein the first light-distributing surface is disposed obliquely relative to an optical axis of the first optical stage, and the object surface is disposed equally obliquely relative to the optical axis of the first optical stage so that light radiated from the first light source onto the first light-distributing surface arrives obliquely on the object surface to be analyzed via the first optical stage, and the first light-distributing surface and the object surface are optically conjugated.

16. Apparatus for analyzing a topography of a surface by strip projection comprising at least one light source for radiating light, at least one light-distributing surface for receiving light irradiated from the at least one light source, at least one optical stage, an object surface to be analyzed of a sample, and a detector for detecting radiation of the object surface to be analyzed, the at least one light-distributing surface being disposed obliquely relative to an optical axis of the at least one optical stage, and the object surface being disposed equally obliquely relative to the optical axis of the at least one optical stage so that light radiated from the at least one light source onto the at least one light-distributing surface arrives obliquely on the object surface via the at least one optical stage, and the at least one light-distributing surface and the object surface are optically conjugate.

17. Apparatus according to claim 16, wherein the object surface to be analyzed is illuminated by an oblique light beam at a wide angle.

18. Apparatus according to claim 16, wherein an image of the object surface in an area of the detector presents a geometric similarity with the object surface.

19. Apparatus according to claim 16, further comprising means for one of manually entering and iteratively and automatically determining an optimum sensitivity in the measurement of the object surface.

20. Apparatus according to claim 16, wherein the at least one optical stage includes a first optical stage of a 4 f-type system having a reflecting diffraction grating providing the at least one light-distributing surface which includes a first light-distributing surface and a second light-distributing surface, wherein a beat created between the reflecting diffraction grating and an image of the reflecting diffraction grating as the first light-distributing surface is projected onto the object surface of the sample and reflected back to the reflecting diffraction grating as the second light-distributing surface, and a beat image is projected onto a detector by a second optical stage for enabling analysis of shape.

21. A dual beam interferometer comprising a light source, a beam splitter surface at which a reference beam and object beams of an object beam bundle are generated, an object surface, at least one optical path-folding stage and at least one optical stage for projecting a course of the object and reference beams, at least one interference means having an interference pattern recordable via a further optical stage by a CCD camera connected to a computer, the at least one optical path-folding stage being provided with a computer-controlled adjusting element so that an optical path difference in the course of the object and reference beams, following the object surface between the reference beam and the object beams of the object beam bundle, is set approximately to zero.

22. A dual beam interferometer according claim 21, wherein the at least one optical stage is provided in the course of the reference beam and the object beams of the object beam bundle following the object surface and having an optical axis extending substantially in parallel to a beam axis.

23. A dual beam interferometer according claim 21, wherein the interference means include a light-distributing surface producing one of a light-diffusing and light-diffracting effect.

24. A dual beam interferometer according to claim 23, wherein the light-distributing surface is a holographic reflecting grating.

25. A dual beam interferometer according to claim 20, wherein the optical path-folding stage is an optical reflecting system having a highly planar reflecting surface.

26. Apparatus for analyzing a shape of a surface comprising at least one light source for providing a light beam, a beam splitter system for splitting the light beam at least once to create two sub-beams and for generating a lateral shear in one of the two sub-beams relative to the other of the two sub-beams, and means for focusing the two sub-beams onto a sample so as to generate two sub-beams by reflection, and a beam recombination system for recombining the sub-beams and for at least one of reducing or eliminating lateral shear between the sub-beams.

27. Apparatus according to claim 26, wherein the beam splitter system for generating lateral shear includes a Michelson's interferometer having at least two retro-reflectors, one polarization-dependent splitting layer, and one nonpolarizing layer, wherein the sub-beams are focused by projection so as to interfere with each other.

28. A method of analyzing the shape of a surface, comprising the steps of splitting a light beam bundle at least once so as to create two sub-beams, one of the two sub-beams having a lateral shear relative to the other of the two sub-beams and the two sub-beams being focused at least once for arrival at a sample in the form of sub-beams so as to generate two sub-beams by reflection, recombining the sub-beams so as to at least one of reduce or eliminate the lateral shear between the sub-beams, and focusing the sub-beams by projection so as to interfere with each other.

29. A method according to claim 28, further comprising the step of evaluating by electronic image processing techniques at least one order of interference which occurs.

\* \* \* \* \*